June 26, 1951     L. E. JOHNSON     2,558,254

TRACTOR CABLE CONTROL UNIT

Filed April 16, 1947     3 Sheets-Sheet 1

INVENTOR.
Lloyd E. Johnson
BY
ATTORNEY

June 26, 1951  L. E. JOHNSON  2,558,254
TRACTOR CABLE CONTROL UNIT
Filed April 16, 1947  3 Sheets-Sheet 2

INVENTOR.
Lloyd E. Johnson
BY Charles M. Fryer
ATTORNEY.

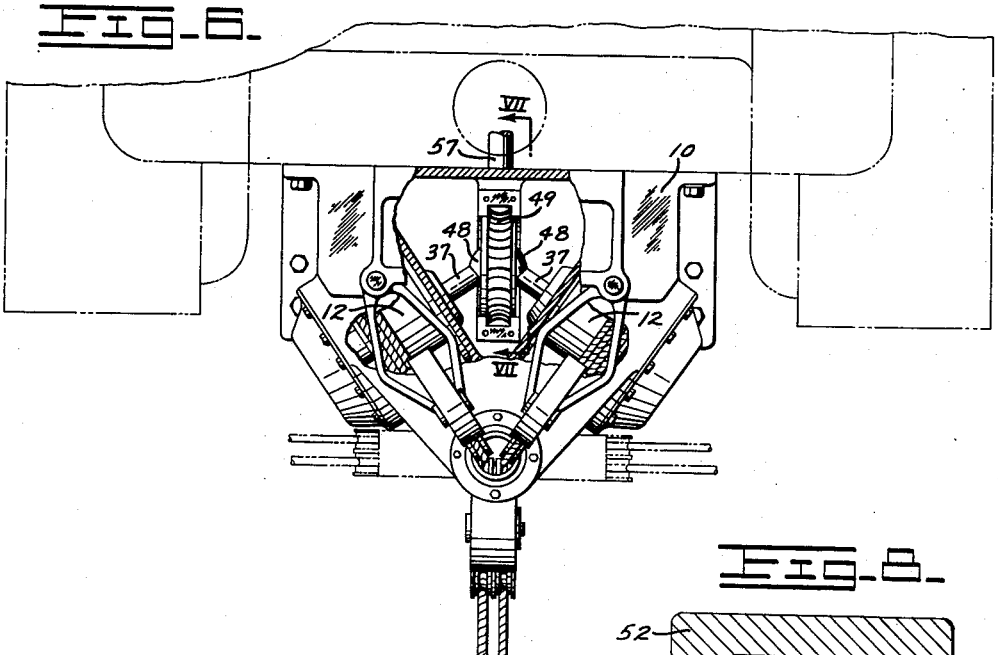
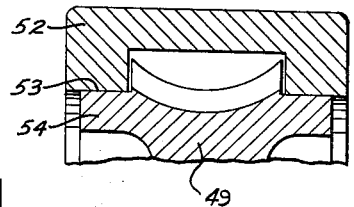
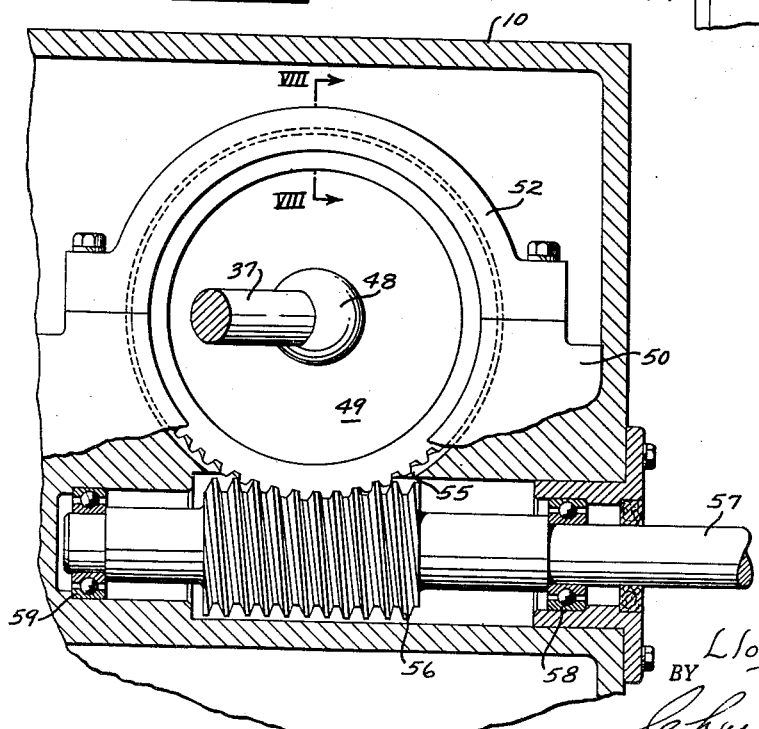

Patented June 26, 1951

2,558,254

UNITED STATES PATENT OFFICE 2,558,254

TRACTOR CABLE CONTROL UNIT

Lloyd Edward Johnson, Peoria, Ill., assignor to Caterpillar Tractor Co., San Leandro, Calif., a corporation of California Application April 16, 1947, Serial No. 741,798

2 Claims. (Cl. 254—166)

This invention relates to cable control units of the kind employed on tractors.

Tractors are commonly provided with a pair of rearwardly disposed cable drums powered from the rear power takeoff shaft of the tractor and controlled from the operator's station. Each drum carries a cable adapted to lead rearwardly to a drawn implement for controlling the operation of the implement and may be payed out or taken in by its drum as required. The drawn implement may be a scraper for example, wherein one cable controls the height of the scraping edge or blade and the other cable controls filling and ejection mechanism. In practice the implement is connected with the tractor by the tractor drawbar so that when turns are negotiated or when the tractor passes over rises or uneven terrain articular movement occurs to stress or slack the cables between the tractor and the implement. This variation in the cables may effect undesirable adjustment of the implement parts controlled by them and is a source of danger and annoyance in operating equipment of this nature.

It is, therefore, an object of the present invention to provide a cable control unit for tractors and the like designed to eliminate or reduce to a minimum the variation in effective length of the control cables upon turning or pitching of the tractor relative to the drawn implement. Another object of the invention is to provide a cable control unit of unusually simple and durable construction and of a design to greatly facilitate assembly and disassembly particularly of the clutch and brake mechanisms associated with the cable drums. A further object of the invention is the provision of a cable control unit with guide or fairlead sheaves arranged to swing free through a wide arc in order to accommodate the cables when the tractor is negotiating a sharp turn. Another object is to provide a unit of this kind that is generally low in structure and position with relation to the tractor to provide a clear field of view for the tractor operator as he looks rearwardly to observe the operation of the drawn implement. Still further objects and advantages of the invention are made apparent in the following description wherein reference is made to the accompanying drawings.

In the drawings:

Fig. 6 is a plan view of a cable control unit like that shown in Fig. 1 but illustrating a modified form of power transmission means;

Fig. 7 is an enlarged fragmentary section taken on the line 7—7 of Fig. 6; and

Fig. 8 is an enlarged fragmentary section taken on the line 8—8 of Fig. 7.

Figure 1:
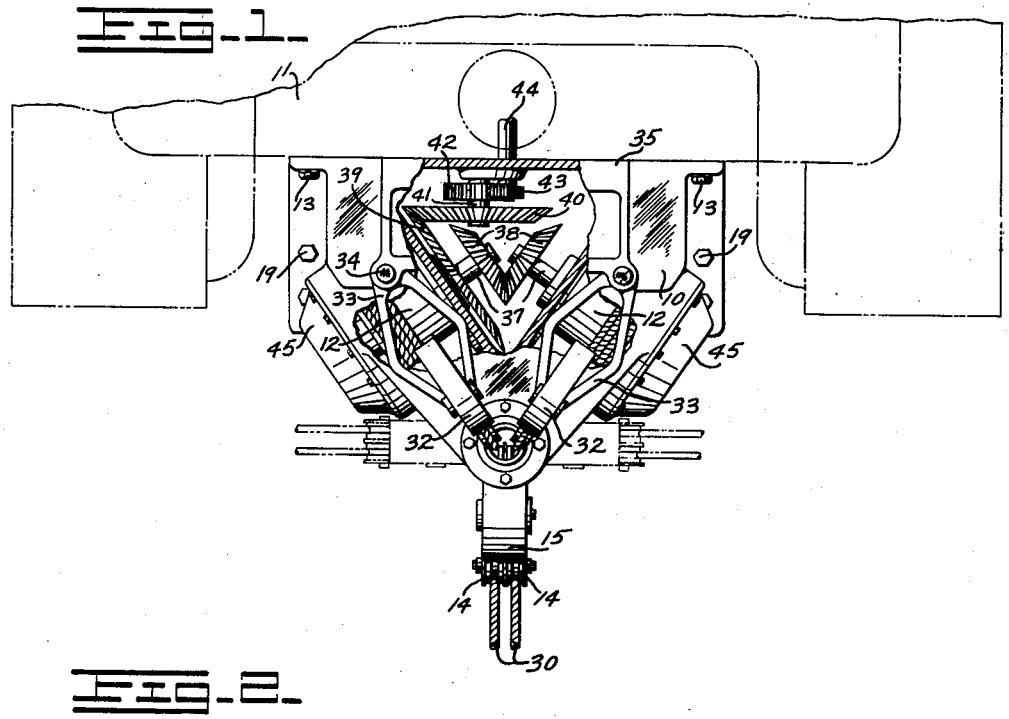
Fig. 1 is a plan view, with portions broken away, of a cable control unit embodying the present invention.
Figure 2:
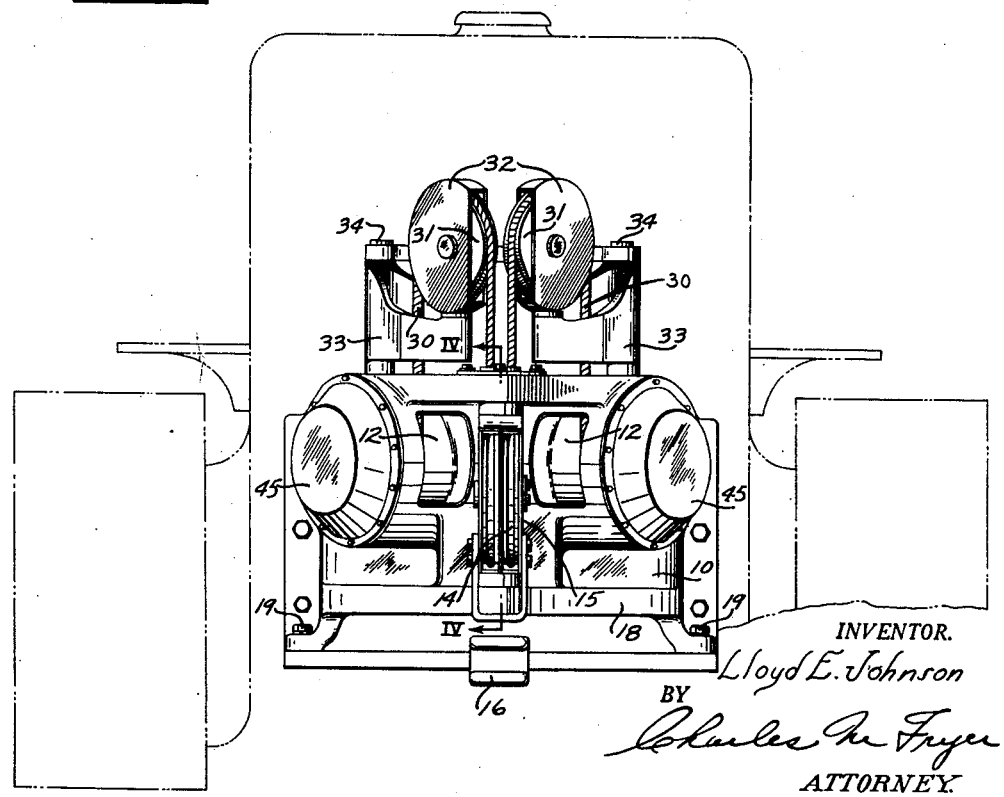
Fig. 2 is a view in rear elevation of the same cable control unit.
Figure 3:
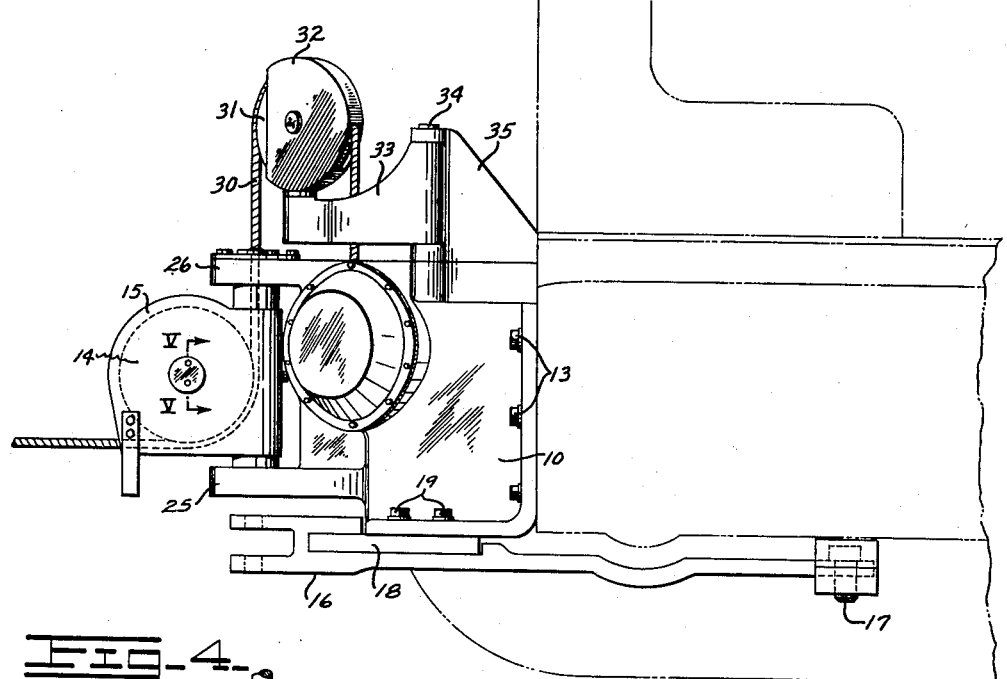
Fig. 3 is a side elevation of the same illustrating the relationship of the unit to the drawbar of a tractor.

The power control unit as shown in Figs. 1 to 3 of the drawings is disposed in a housing 10 having one side wall supported on the rear wall of a tractor transmission case illustrated in broken lines at 11. The housing 10 supports a pair of cable drums 12 mounted on converging axes so that planes normal to their axes form a triangle with the side wall that is secured as by cap screws 13 to the tractor transmission case. With this arrangement the axes of the drums 12 are disposed on angularly disposed or rearwardly diverging lines while the general planes of the windings of the cable on the drums or the lines followed by the cable leaving the drums converge rearwardly toward a single central point. A pair of fairlead sheaves 14 are disposed in a single sheave block 15 and the block 15 is supported for pivotal movement about the single point toward which the cables from the drums 12 converge. The advantage of this position of the fairlead sheaves is best illustrated in Figs. 2 and 3 wherein it appears that the sheaves 14 are disposed directly above and substantially in vertical alignment with a drawbar 16 of the tractor. The drawbar as shown in Fig. 3 is pivotally connected with the tractor as by a pin 17 and is free to swing from side to side through a limited arc being guided for such swinging movement on a bar 18 supported as by screws 19 extending downwardly through suitable flanges on the opposite lower edges of the cable control unit housing 10. Thus, the guiding points or points of connection of the cables with the tractor are in close proximity to the point of connection between the tractor and the drawn implement. Consequently, as the tractor and implement turn or pitch with relation to each other the effective variation in the length of the cables due to the relative movement between the tractor and the implement is maintained at a minimum.

Figure 4:
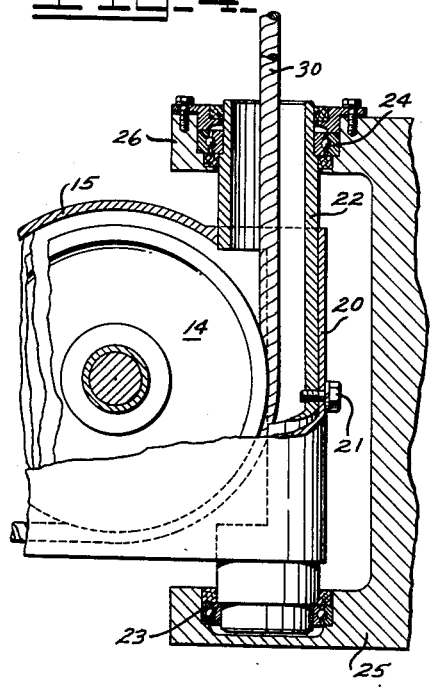
Fig. 4 is an enlarged fragmentary view with parts in section taken on the line 4—4 of Fig. 2.
Figure 5:
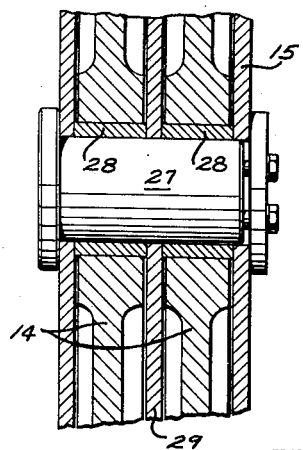
Fig. 5 is an enlarged fragmentary section taken on the line 5—5 of Fig. 3.

Another advantage in this mounting of the fairlead sheaves is that, being positioned at the rearmost portion or apex of the angle formed by the cables leading from the drums, they are free to swing through a wide arc in either direction as indicated in the two dotted line positions in Fig. 1 without interfering with the housing. This enables the tractor to negotiate a sharp turn without fouling or jamming the cables that are directed through the fairlead sheaves. The particular manner in which the fairlead sheaves 14 are journaled and supported is shown in Figs. 4 and 5 wherein the sheave block 15 is shown as having a vertical part 20 secured as by a screw 21 to a vertically disposed hollow spindle 22. This spindle is journaled in bearings 23 and 24 supported in brackets 25 and 26, respectively, formed integrally with and extending rearwardly from the main housing 10. The sheaves 14 are, as shown in Fig. 5, supported for rotation in the block 15 by a central bearing pin 27 and bearing bushings 28. A dividing plate 29 preferably separates the sheaves in the block. The cables 30, one of which is wound upon each of the drums 12, pass over cable laying sheaves 31 disposed in blocks 32, as they leave the drums, and then pass downwardly through the hollow spindle 22 and under the fairlead sheaves 14 as shown.

The blocks 32 rotatably support the cable laying sheaves 31 and are themselves supported for movement about a vertical pivotal axis on swinging arms 33. Each of the arms 33 is of hollow construction as shown in Figs. 1 and 2 to permit the cable to pass through it and each is supported for swinging movement about a vertical pin 34 supported in a bracket 35 formed as a part of the housing 10. Because of the swinging movement of the arms 33 and the pivotal movement of the sheave blocks 32, the sheaves 31 are free to swing and turn in a manner to follow the changing course of the cable as it winds or unwinds in relation to the surface of the cable drum. The construction and disposition of the cable laying sheaves is such that they are disposed in a low position or close to the top of the cable control unit so that they do not obstruct the view to the rear of the operator from the driver's seat of the tractor.

One form of power transmission for imparting a drive from the power takeoff shaft of the tractor to the drums 12 is illustrated in Fig. 1 of the drawings. In this figure, each of the drums 12 is supported on a shaft 37 and these shafts are connected for simultaneous rotation by meshing bevel gears 38 fixed one to each of the shafts 37. One of the shafts 37 carries a larger bevel gear 39 meshing with a bevel gear 40 on a stub shaft 41. Spur gears 42 and 43 form a driving connection between a power takeoff shaft 44 of the tractor and the stub shaft 41. Thus, power is continuously transmitted through the gear train described to both of the shafts 37.

Clutch and brake mechanisms are interposed between the shafts 37 and the cable drums 12. These clutch and brake mechanisms, however, as well as control means associated with them and disposed within the reach of the tractor operator may be of any conventional design and their illustration is not necessary to an understanding of the present invention. The clutch and brake means are disposed outwardly of the drums and under cover plates illustrated at 45. Because of the outwardly diverging angle of the axes of the drums 12 their clutch and brake mechanisms are disposed for convenient access when repair or adjustment is necessary.

A modified form of drive means for the same control unit is shown in Figs. 6, 7 and 8 of the drawings. In these figures, the shafts 37 through which power is transmitted to the drums 12 are shown as extended and connected as by constant speed universal joints of conventional manufacture shown at 48 with a centrally disposed worm gear 49. The worm gear 49 is best illustrated in Fig. 7 as mounted centrally of the housing 10 in a large bearing formed of a lower bearing part 50 and an upper bearing cap 52. Fig. 8 shows a section through the upper portion of the bearing cap and shows the bearing surfaces of the gear at 53 as formed on flanges 54 adjacent its outer periphery. This construction and mounting of the gear 49 leaves its central portion free for reception of the universal joints 48. The lower bearing portion 50 is cut away as indicated at 55 in Fig. 7 so that the periphery of the gear extends through the opening to mesh with a driving worm 56. The worm is carried by a shaft 57 supported in bearings 58 and 59 and the shaft 57 may be an extension of or may be connected with the power takeoff shaft of the tractor.

I claim:

1. A cable control unit having a sidewall adapted to be secured to a tractor or the like, a pair of cable winding drums on the unit angularly related to each other and to the side wall with planes normal to their axes forming a triangle with the plane of said side wall whereby cables wound upon the drums will lead off toward a common point, and a double fairlead sheave block assembly supported at said point.

2. A cable control unit for connection with the rear part of a tractor over the drawbar thereof comprising a side wall adapted to be secured to the tractor, a pair of cable winding drums, shafts journalled in said unit and supporting said drums, said shafts converging toward the tractor with planes normal to their axes forming a triangle with the plane of said side wall, cable laying sheaves movably supported above the drums to guide the cables to and from the drums, and a double sheave block fairlead pivotally supported adjacent the apex of said triangle to the rear of the tractor to receive cable from the cable laying sheaves and guided to toward an implement connected with the tractor drawbar.

LLOYD EDWARD JOHNSON.

REFERENCES CITED

The following references are of record in the file of this patent:

UNITED STATES PATENTS

| Number | Name | Date |
|---|---|---|
| 988,331 | Greulich et al. | Apr. 4, 1911 |
| 2,362,220 | Shoemaker | Nov. 7, 1944 |

FOREIGN PATENTS

| Number | Country | Date |
|---|---|---|
| 9,327 | Great Britain | of 1901 |
| 384,929 | Great Britain | Dec. 15, 1932 |